United States Patent [19]
Jensen

[11] Patent Number: 5,866,906
[45] Date of Patent: Feb. 2, 1999

[54] GAMMA DETECTOR LOCKING MECHANISM

[75] Inventor: Jorn-Erik Jensen, Hoersholm, Denmark

[73] Assignee: General Electric Company, Waukesha, Wis.

[21] Appl. No.: 866,727

[22] Filed: May 30, 1997

[51] Int. Cl.[6] .................................................. G01T 1/166
[52] U.S. Cl. ................................ 250/363.05; 250/363.08
[58] Field of Search ........................ 250/363.04, 363.05, 250/363.08

[56] References Cited

U.S. PATENT DOCUMENTS 5,444,252  8/1995  Hug et al. ...................... 250/363.05 X
5,523,571  6/1996  Velazquez et al. ................. 250/363.05
5,691,538  11/1997 Ohike et al. ....................... 250/363.05
5,717,212  2/1998  Fulton et al. ...................... 250/363.05

Primary Examiner—Edward J. Glick
Attorney, Agent, or Firm—Quarles & Brady

[57] ABSTRACT

An apparatus for generating gamma emission images including two gamma cameras mounted to a gantry wherein the gantry includes two moveable rings and a locking mechanism which can lock the two moveable rings together in one of two separate configurations. Each camera is mounted to a separate one of the two moveable rings and defines a camera axis, the two camera axes together defining a configuration angle and two different configuration angles are possible. By locking the two moveable rings together a single motor and associated hardware and software can be used to rotate both cameras about an imaging axis simultaneously.

13 Claims, 6 Drawing Sheets

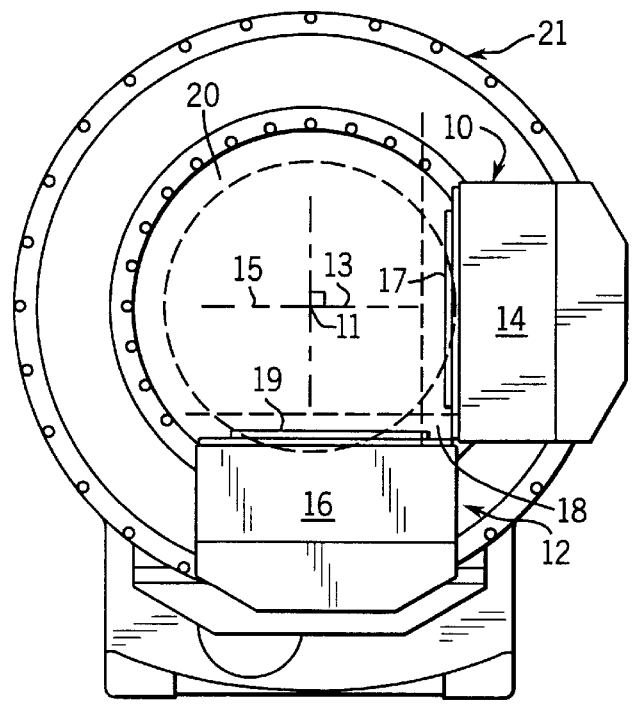
FIG. 1
PRIOR ART
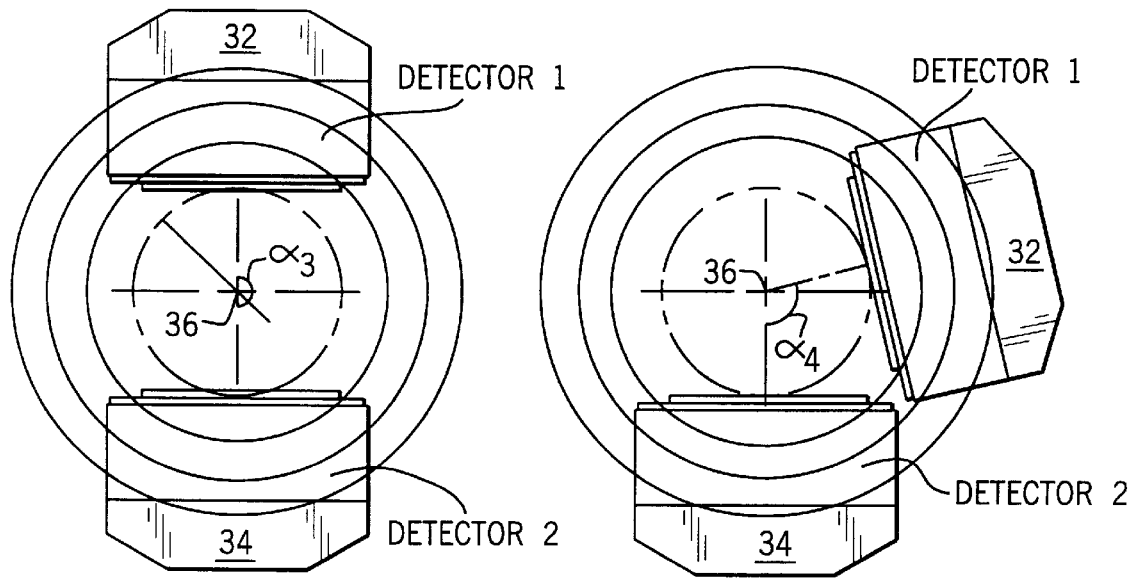
FIG. 8
FIG. 9

GAMMA DETECTOR LOCKING MECHANISM

CROSS REFERENCE TO RELATED APPLICATION

Not applicable

STATEMENT REGARDING FEDERALLY SPONSORED RESEARCH OR DEVELOPMENT

Not applicable

BACKGROUND OF THE INVENTION

The present invention relates to gamma cameras and more specifically to a gamma detection system including a locking mechanism for maintaining two gamma detectors in specific configurations.

Single photon emission computed tomography (SPECT) examinations are carried out by injecting a dilution marker comprising a compound labeled with a radiopharmaceutical into the body of a patient to be examined. A radiopharmaceutical is a substance that emits photons at one or more energy levels. By choosing a compound that will accumulate in an organ to be imaged, compound concentration, and hence radiopharmaceutical concentration, can be substantially limited to the organ to be imaged.

While moving through a patient's blood stream the marker, including the radiopharmaceutical, becomes concentrated in the organ to be imaged. By measuring the intensity of the photons emitted from the organ, organ characteristics, including irregularities, can be identified.

To measure photon intensity, at a prescribed time following marker injection, a planar gamma camera is positioned adjacent the portion of a patient's body that includes the organ to be images. During an imaging period with the camera supported in a single position and the patient remaining as still as possible, the camera detects photon emissions and can create a plan view of the organ corresponding to the camera position.

A gamma camera consists of a collimator, a scintillation crystal and a detector. The collimator typically includes a lead block with tiny holes therethrough which define preferred photon paths. The preferred paths are usually unidirectional and perpendicular to the length of the collimator. The collimator blocks emissions toward the crystal along non-preferred paths.

The scintillation crystal is positioned adjacent the collimator on a side opposite a patient. The crystal absorbs photons that pass through the collimator on a front surface and emits light from a back surface each time a photon is absorbed. The detector comprises a planar arrangement of photomultiplier tubes (PMTS) positioned adjacent the crystal and on a side of the crystal opposite the collimator. Light emitted by the crystal is detected by the PMTs which in turn generate analog intensity signals indicating the precise position of emission impact on the crystal.

A processor receives the PMT signals and digitally stores corresponding information as an M by N array of elements called pixels. The values of M and N are commonly 64 or 128 pixels across each of the two image dimensions. Together the array of pixel information is used by the processor to form an emission image corresponding to the specific camera position.

In addition to the camera and processor, gamma detection systems also include either a stand or a gantry and a patient support table. The stand or gantry supports the camera in one position at a time adjacent a portion of a patient to be imaged and can be used, after data to generate one image has been collected, to move the camera to a second position with respect to the patient, to generate a second image if desired.

Different materials are characterized by different gamma particle attenuation coefficients (i.e. photons are attenuated to different degrees as they pass through different portions of a patient's body). For example, a greater percentage of photons will pass through an inch of bone than will pass through an inch of tissue. Similarly, a greater percentage of photons will pass through the air filled space in a lung or sinus cavity than will pass through a comparable space filled with tissue or bone. In addition, a smaller percentage of photons will pass through four inches of tissue than will pass through one inch of similar tissue.

For this reason, image quality is effected by camera distance from an organ to be imaged. Therefore, whenever images are generated, every effort is taken to position an organ to be imaged as close to the camera as possible by either moving the camera (i.e. the stand or camera on the gantry) or the patient (i.e. the patient table).

Most gamma imaging procedures are used to generate tomographic images and therefore require a plurality of emission images, each image taken by positioning the detector parallel to, and at a different imaging angle about, an imaging axis. In order to produce the best images possible, between each imaging period, the patient may be repositioned with respect to the camera so that the organ to be imaged is as close as possible to the camera. After a plurality of images are generated, a processor is used to compensate for patient repositioning during separate imaging periods. Next, the processor uses the compensated image data to construct pictures of transaxial slices of the body using algorithms and iterative methods that are well known to those skilled in the tomographic imaging art.

Where an organ to be imaged is located on one side of a patient's body, often images will only be generated for the side of the patient's body which includes the organ so that data from the other side of the patient's body which has been attenuated to a greater degree does not reduce the quality of the final images. For example, in the case of heart imaging (i.e. cardiac imaging), typically images will only be generated for 180° through the left hand side of a patient's chest and the other 180° of possible data will be disregarded. In this case, the processor generates the tomographic images using the reduced set of emission data. In addition to increasing the quality of resulting images, limiting imaging to a single side of a patient's body reduces imaging time.

Ideally, given enough time, a gamma camera can provide extremely accurate images for diagnostic purposes. Unfortunately, in reality, there are practical limitations on imaging period length which have to be considered when configuring a detector system and planning imaging sessions. First, imaging hardware and software are relatively expensive and therefore, imaging throughput (i.e. number of imaged patients) must be kept high to justify system costs.

Second, because a patient has to remain nearly completely still during an imaging procedure, prolonged imaging procedures cause patient discomfort. A related problem is that when a patient becomes uncomfortable, the patient often moves. When a patient moves resulting images are distorted. Distorted images can cause medical personnel to incorrectly diagnose healthy tissue as irregular tissue or vice versa. For these reasons any method to reduce the length of imaging periods without reducing accuracy would be advantageous.

One solution to reduce imaging period length is to alter the radiopharmaceutical so that photon emission levels are increased. In this way, data sufficient to form an image could be gathered in relatively less time. Unfortunately this strategy can be dangerous to a patient's health. Typically, in order to minimize patient exposure to radiation, a radiopharmaceutical is chosen which has relatively low photon emission levels. As a result, each emission image requires an appreciable amount of time (e.g. 40 seconds) to generate.

Another solution is to reduce the number of images generated. Unfortunately, this solution reduces image quality which can itself result in diagnostic errors. Typically, to generate sufficient data to form useable tomographic images, at least 64 views equispaced about 360°s surrounding the portion of a patient's body including an organ to be images are required. With 64 views generated by a single camera, an entire imaging process can take longer than 40 minutes to complete. To increase image quality by reducing image granularity, the total number of images can be increased. If the number of images is doubled to 128, required imaging time can be as long as one hour and twenty minutes.

One other solution is to provide more than a single detector so that data for more than one imaging angle can be collected simultaneously. While additional imaging hardware increases system cost, the additional cost of some hardware intensive systems can usually be justified by increased throughput, increased patient comfort and better images due to less patient movement.

For these reasons many systems now employ two gamma cameras positioned around an imaging area to generate two emission images simultaneously. One popular two camera configuration includes two gamma cameras, each centered on a different camera axis that passes through the imaging axis wherein the camera axes are separated by 180° (i.e. the two cameras oppose each other). In this case, 360° imaging can be provided by rotation through 180° and imaging time can be cut in half. Here, for the cost of two cameras, imaging time is reduced by 50%.

In the case of cardiac imaging, two cameras can be configured so that their camera axes form a 90° angle about the imaging axis. In this case, the 180° of imaging data required to generate a tomographic image can be collected by rotation of the cameras through 90°.

To accommodate fast 360° and 180° imaging, many gamma camera systems now include two gamma cameras which can be configured in either an opposing position or so that their camera axes define a 90° angle about the imaging axis. To this end, these systems include two motors and associated control hardware and software, one motor for moving each of the two cameras independently of the other camera. Thus, when 360° imaging is required, the cameras are oriented so as to oppose each other and the first and second motors simultaneously move the two cameras about the imaging axis through 180° rotation, stopping at each required imaging angle.

When 180° imaging is required, one of the motors is used to rotate an associated camera about the rotation axis while the other camera is stationary until the camera axes define a 90° angle about the imaging axis. Then, to generate 180° imaging, the two cameras are rotated through 90°, one camera collecting 90° of data and the other camera collecting the other 90° of data.

While these two camera systems are versatile and relatively fast, they have a number of shortcomings. First, these systems are hardware intensive. Each system requires two separate motors and associated control hardware, one motor and associated hardware for each of the two cameras. In addition, each system also requires dedicated control hardware and software that can correlate the positions of both cameras during imaging to ensure that the 180° or 90° angle between the camera axes remains constant.

Second, referring to FIG. 1, a system including two cameras 10, 12 configured so that their camera axes define a 90° angle about an imaging axis 11 is illustrated. To reduce stray radiation within an imaging room, gamma cameras 10, 12 typically include a radiation stopping boot 14, 16 which cradles the crystal and detector (not shown) so that photons entering camera collimators 17, 19 are stopped inside the boot. The two cameras 10, 12 are shown mounted to an annular gantry 21 that defines an imaging area 20.

When two cameras 10, 12 are oriented at 90° about a rotation axis 11, the boots 14, 16 interfere at a common edge. Because the boots 14, 16 prohibit crystal placement along the lateral most sections of the cameras, when the boot edges interfere, a dead space 18 that cannot be images by either camera 10, 12 results. If an organ to be imaged is located within dead space 18, imaging information cannot be obtained without moving the patient to a different section of the imaging area 20. While this may be acceptable in some cases, in other cases the increased distance between an organ to be imaged and the cameras will reduce data precision and will effect final image quality. In addition, in some cases where the cameras are supported by a small gantry, it will be impossible to move a patient into a position within the imaging area 20 where an organ to be imaged will not be at least partially within the dead space. In these cases only inferior images generated on the side of the patient opposite the organ will be generated, the usefulness of which would be questionable. Thus, with cameras spaced at 90° about the rotation axis, the effective imaging area 20 is substantially reduced.

For all of the reasons discussed above, it would be advantageous to have a gamma detection system that can quickly collect emission data required to generate precise tomographic images through either 360° or 180° of rotation which is relatively inexpensive.

BRIEF SUMMARY OF THE INVENTION

The present invention provides a gamma camera system including first and second opposed planar gamma cameras mounted to a gantry including a double ball bearing and a single drive gear. The ball bearing includes at least one annular stationary ring centered on an imaging axis and at least first and second moveable rings, the first moveable ring mounted to the stationary ring for rotation about the imaging axis and the second moveable ring mounted to the first moveable ring for rotation about the imaging axis. The drive gear is connectable to the motor and linked to either the first or second moveable ring to rotate the linked ring about the imaging axis. The first camera is mounted to the first moveable ring and the second camera is mounted to the second moveable ring. Each camera is positioned along a separate camera axis that intersects the imaging axis. A locking mechanism is provided which can be used to lock the first and second moveable rings together in at least two different configurations defining different configuration angles, when locked, the first and second moveable ring are rotated together when the drive gear rotates the linked ring.

One object of the present invention is to provide a dual camera gamma detecting system wherein a single motor and associated hardware and software can be used to rotate two cameras. To this end, one of the moveable rings can be moved with respect to the other between two separate positions and locked in one of the two positions with respect to the other moveable ring. Then, by rotating one of the moveable rings, because the other ring is locked thereto, both rings move together.

Another object of the invention is to provide a system having the above described characteristics that is inexpensive. By configuring the two camera systems as described above one of the motors and associated hardware and software is eliminated thus reducing system costs. In addition, the hardware and software required to correlate movement of two separate cameras is eliminated because the two movement rings are locked together during movement between different imaging angles.

Preferably, one of the configuration angles is 180° and the second configuration angle is between 90° and 105°. Most preferably, the second configuration angle is 101.25°.

Another object of the invention is to provide a detection system wherein there is no appreciable dead space. To this end, it has been found that with typical cameras having a radiation stopping boot, the dead space can be substantially eliminated by configuring the two cameras so that their camera axes form a 101.25° angle as opposed to a 90° angle. Depending on boot and gantry size, the configuration angle may be slightly greater or slightly less than 101.25°.

Yet another object is to provide a detection system where either 360° imaging or 180° imaging can be performed as quickly as possible. To this end, the present system includes cameras and a gantry that allow camera positions to be changed between two separate configurations. One configuration with the cameras positioned so that their camera axes define a 180° angle about the imaging axis is ideal for 360° imaging. The other configuration with the cameras positioned so that their camera axes define a 101.25° angle about the imaging axis is ideal for 180° cardiac imaging.

One other object is to provide cardiac imaging data which allows a user to choose between imaging data to generate ideal tomographic images. With the cameras positioned so that their camera axes define a 101.25° angle, by gathering imaging data through 90°, 101.25° of imaging data is generated. Therefore, depending on artifacts in the first and last few images, a user can determine which images (the first or last or some combination thereof) will result in the best final tomographic image. Then the user can instruct the processor to use only the best data to generate final images.

In one aspect the ball bearing may further include a limiter that prohibits the locking mechanism from being unlocked unless at least one of the first and second moveable rings is in an unlocking orientation with respect to the stationary ring.

Thus, one other object of the invention is to provide a system wherein the two cameras will be locked in a single orientation with respect to each other unless purposefully unlocked. The limiter achieves this purpose. In a preferred embodiment the stationary ring substantially fills an annular space and forms an unlocking alcove. In this case, the locking mechanism may include a post which extends into the alcove when unlocked and the stationary race may form the limiter by prohibiting unlocking of the locking mechanism unless the post is aligned with the alcove.

In another aspect, when in the unlocking orientation, one of the first or second cameras may be positioned directly below the rotation axis.

The invention also includes a method to be used with the above described apparatus. The method is for altering the configuration angle between the imaging cameras. The method includes the steps of rotating the gantry to an unlocking orientation, uncoupling the first and second moveable rings, rotating the first moveable ring about the rotation axis so that the first cameras moves into a position defining the second configuration angle and locking the first and second moveable rings so that the first and second cameras define a second configuration angle.

These and other objects, advantages and aspects of the invention will become apparent from the following description. In the description, reference is made to the accompanying drawings which form a part hereof, and in which there is shown a preferred embodiment of the invention. Such embodiments do not necessarily represent the full scope of the invention and reference is therefore made, to the claims herein for interpreting the scope of the invention.

BRIEF DESCRIPTION OF THE SEVERAL VIEWS OF THE DRAWINGS

FIG. 1 is a plan view of a prior art gama camera configuration;

FIG. 8 is a plan view of the inventive system with detectors arranged so as to define a first configuration angle; and FIG. 9 is similar to FIG. 8 except that the detectors define a second configuration angle.

DETAILED DESCRIPTION OF THE INVENTION

A. Hardware

Figure 2:
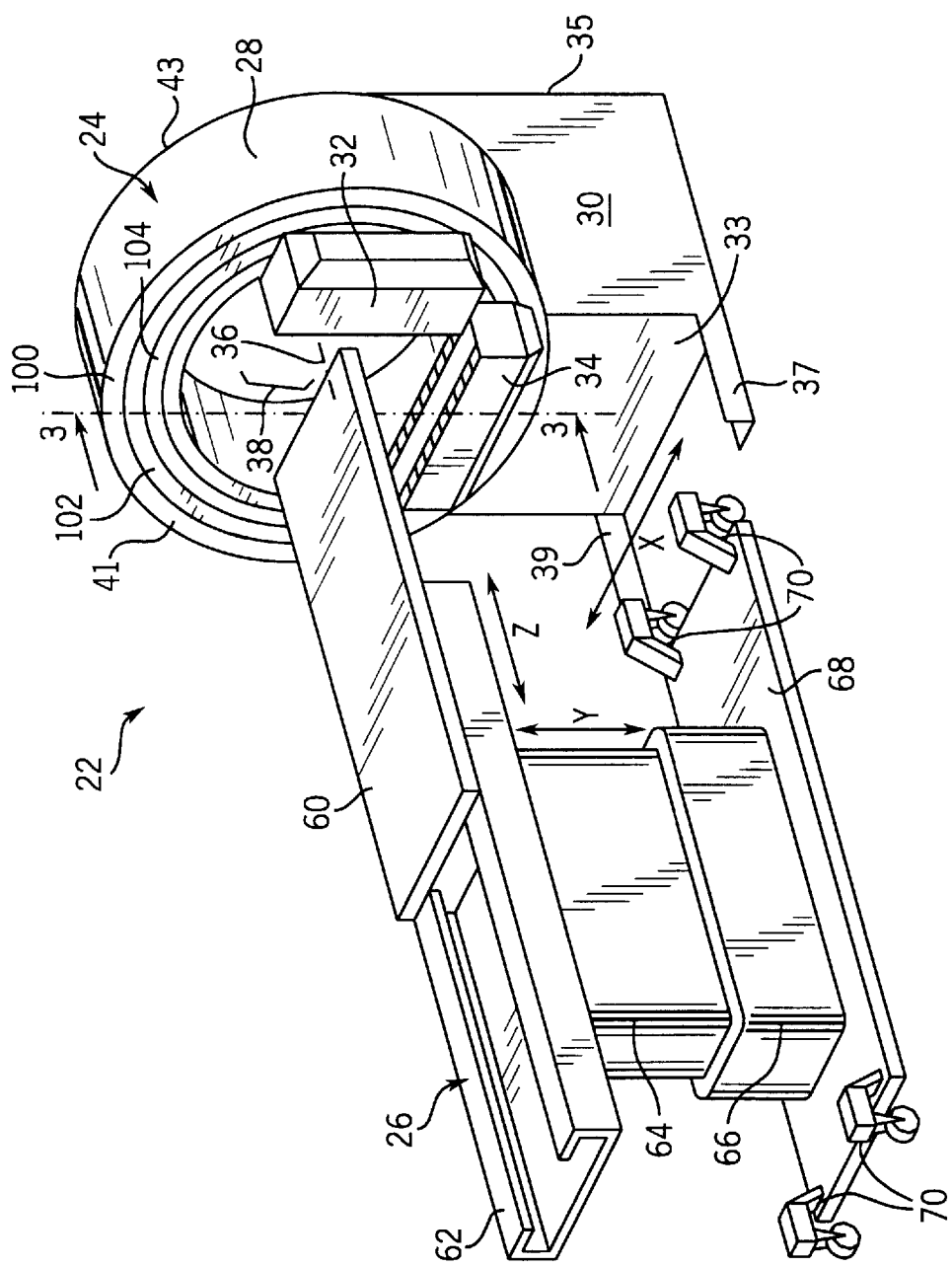
FIG. 2 is a perspective view of a gamma camera imaging system employing the present invention.

Referring now to the drawings, wherein like reference numerals represent corresponding elements throughout the several views, and more specifically, referring to FIG. 2, there is shown, generally at 22, an imaging system including a tomography machine 24 and a patient support table 26.

Table 26 includes a top surface 60 interleaved to a lower bracket member 62 which allows supported movement of the top surface 60 along a scanning or horizontal Z-axis. The bracket member 62 is supported by a vertical leg 64 which extends upwardly from a collar 66. The length of leg 64 can be increased or decreased to raise or lower top surface 60 along a vertical Y-axis. Collar 66 is secured to a planar dolly 68 having four wheels collectively identified by the numeral 70, one wheel 70 attached at each of four corners. The wheels 70 allow an operator to move the entire table 26 laterally along an X-axis or along the Z-axis. Thus, the table 26 allows an operator to move the top surface 60 and a patient thereon within a range of three dimensional space.

Figure 3:
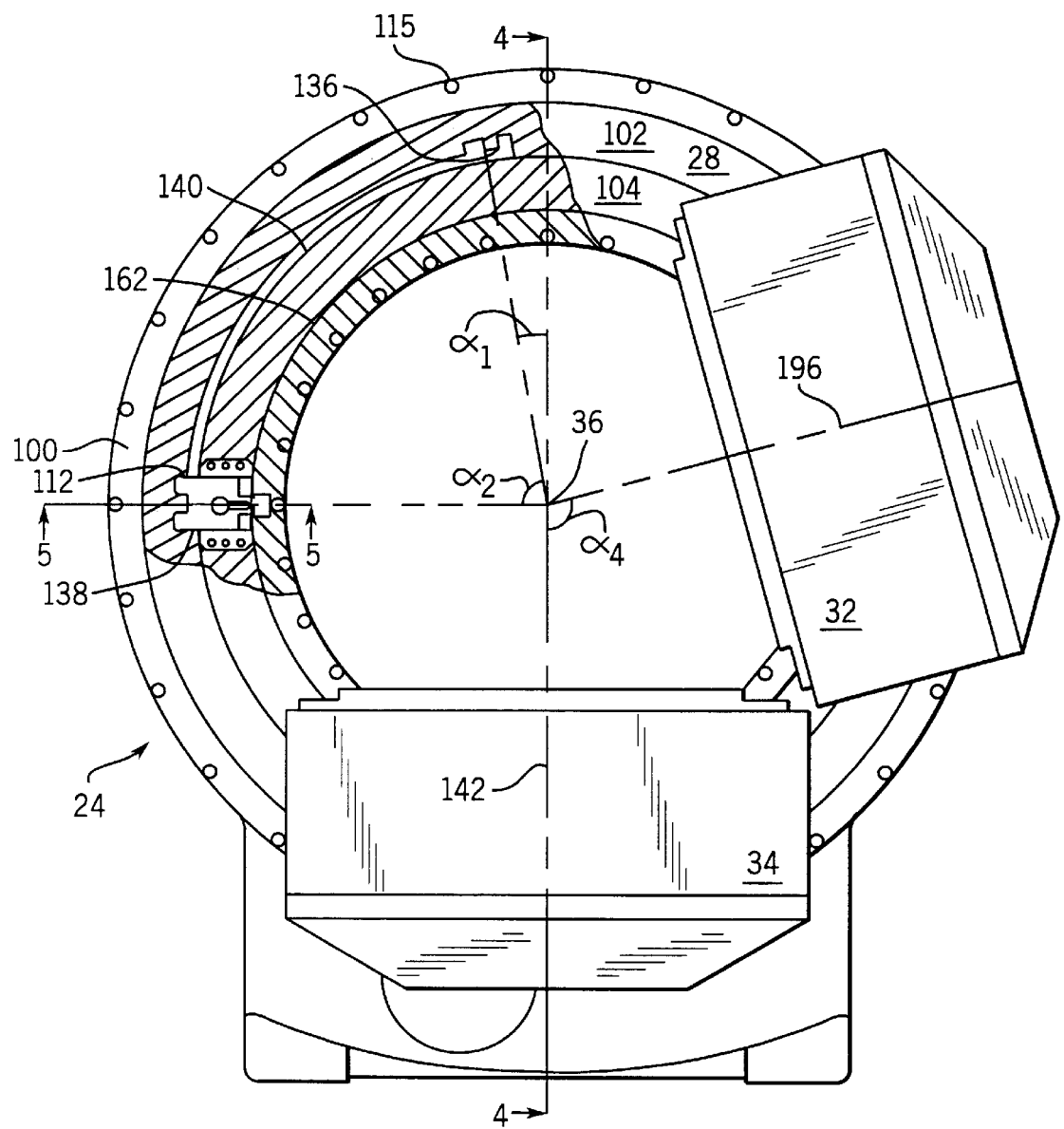
FIG. 3 is a partial cross-sectional view taken along the line 3—3 of FIG. 2.
Figure 4:
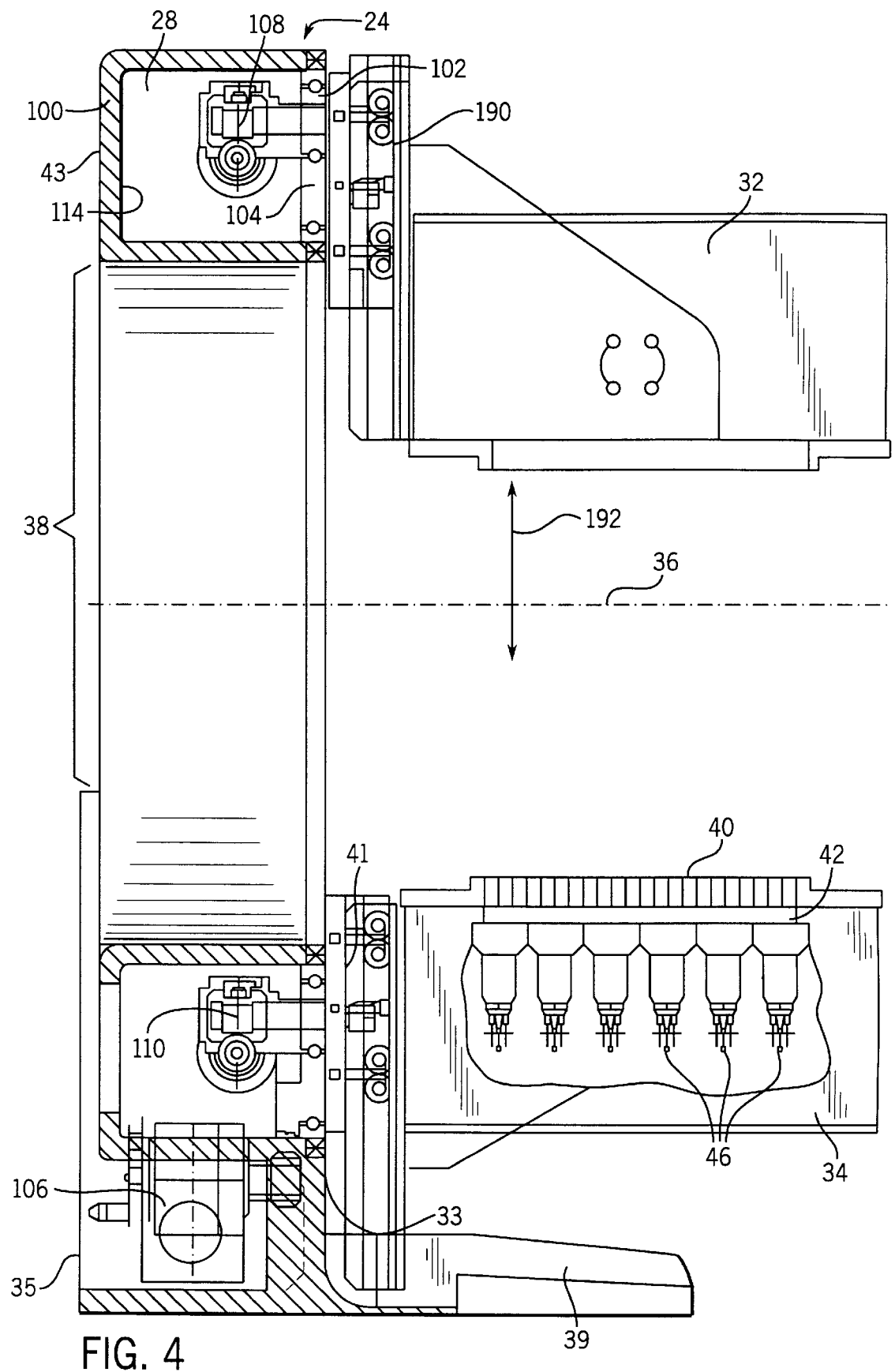
FIG. 4 is a partial cross-sectional view taken along the line 4—4 of FIG. 3, albeit with the two cameras in an opposing configuration.

Referring to FIGS. 2, 3 and 4, the tomography machine 24 includes a pedestal 30, a gantry 28 and two planar gamma cameras 32, 34. The pedestal 30 has a front end 33 and a back end 35 and includes two stabilizing legs 37, 39 which extend forward from the front end 33, distal ends of the legs 37, 39 contacting a ground surface in front of the pedestal to stabilize the pedestal front end 33 as the tomography machine 24 is generally front end heavy. The top surface of the pedestal 30 is generally shaped concavely upward so as to receive an outer surface of gantry 28. In addition, the pedestal 30 houses a rotational motor 106 for rotating moving components of the gantry 28 about a central gantry rotation axis 36 as described in more detail below.

The pedestal 30 supports the gantry 28 in an upright vertical orientation so that its imaging axis 36 is horizontal and can be parallel to the support table Z-axis. The gantry 28, like the pedestal 30, has a front end and a back end defined by front and back surface 41 and 43, respectively.

Figure 5:
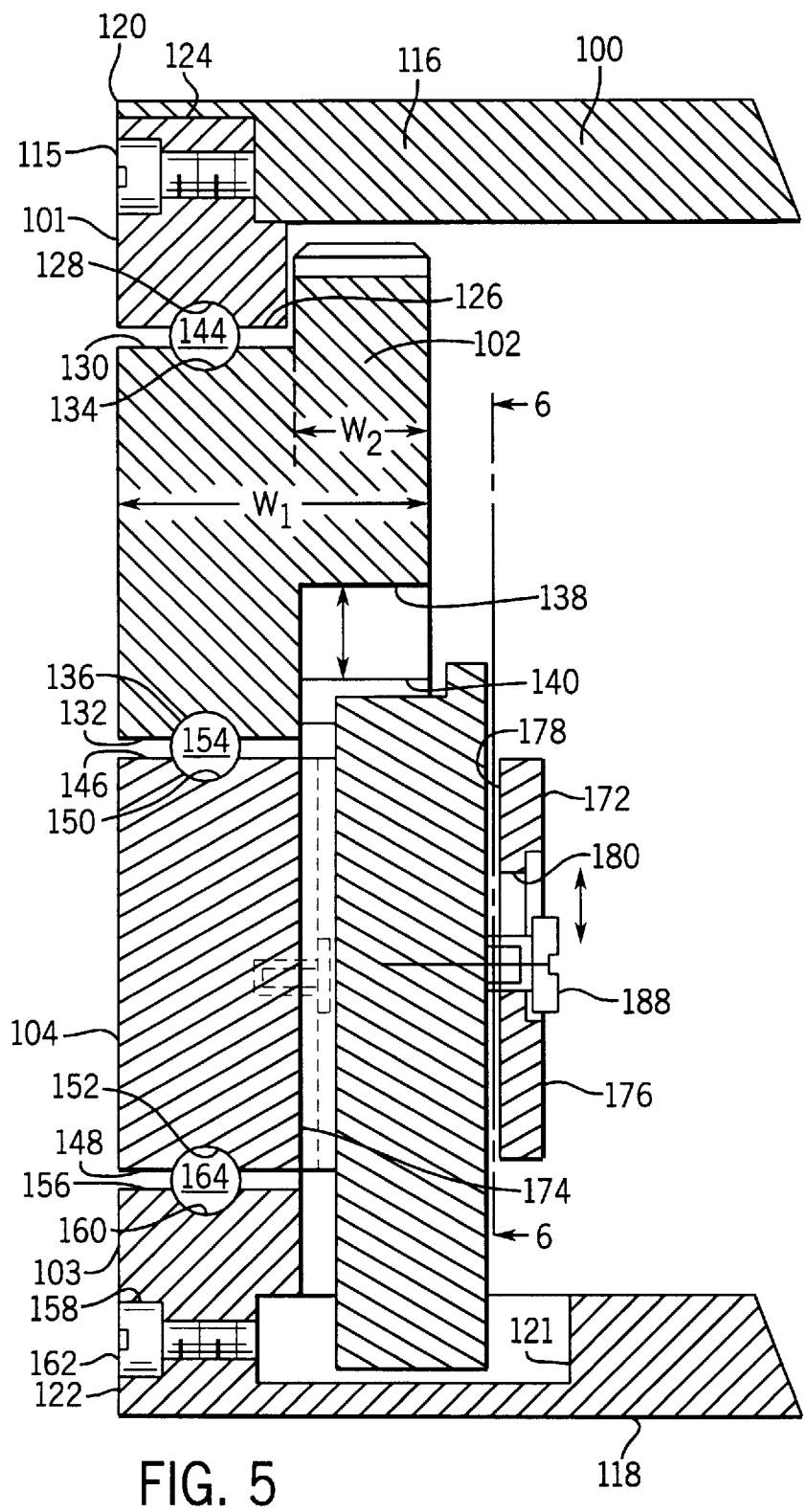
FIG. 5 is a cross-sectional view taken along the line 5—5 of FIG. 3.
Figure 6:
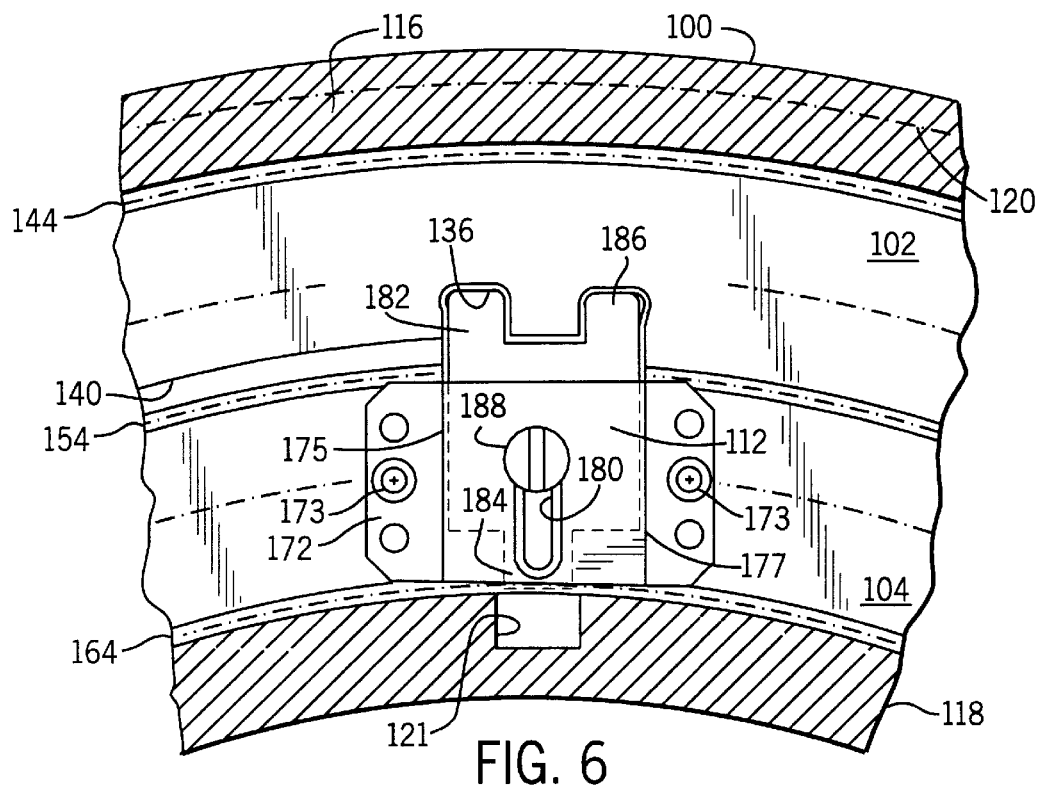
FIG. 6 is a cross-sectional view showing a preferred locking mechanism in a locked orientation.
Figure 7:
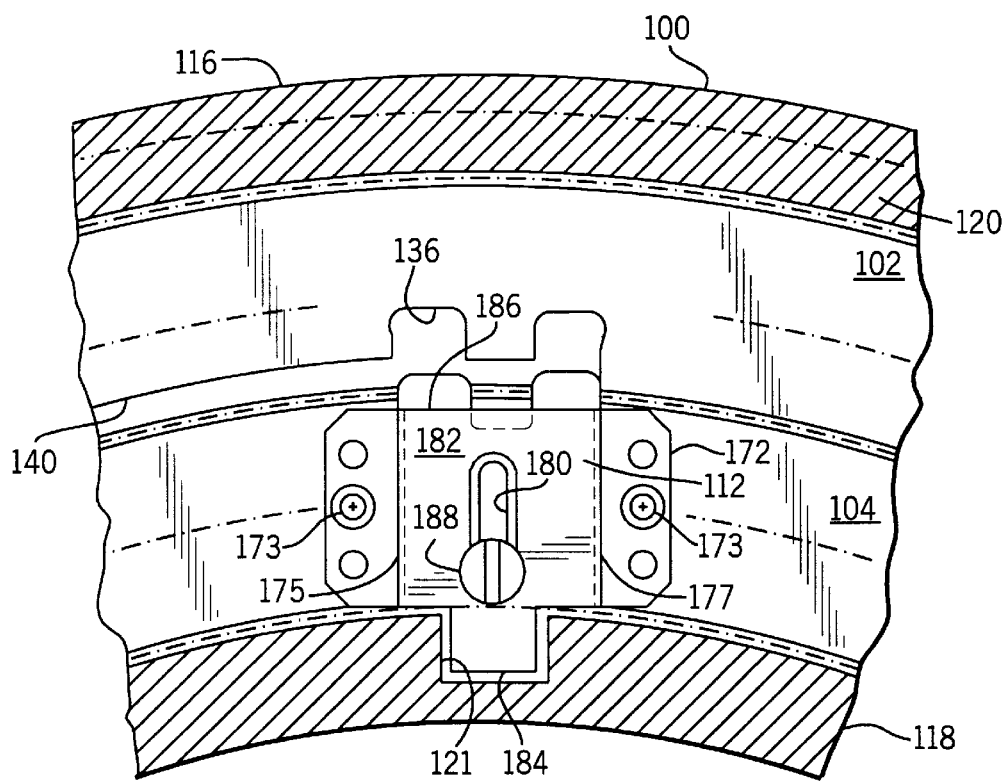
FIG. 7 is similar to FIG. 6 except that the locking mechanism is in an unlocked orientation.

Referring still to FIGS. 2, 3 and 4, and also to FIGS. 5, 6 and 7, the gantry 28 includes a ball bearing or race housing 100, first and second stationary rings 101, 103, respectively, first and second moveable rings 102, 104, respectively, first and second radial motors 108, 110, respectively (see FIG. 4) and a locking mechanism 112.

The race housing 100 is annular and concentric about the imaging axis 36 and forms a "U" shaped housing channel 114 which opens in the direction of gantry front surface 41.

The housing 100 has opposing outer and inner walls 116, 118, respectively, the outer wall 116 having a distal edge 120 and the inner wall 118 having a distal edge 122. The inner wall 118 also forms a single unlocking recess 121 (see FIGS. 3, 5, 6 and 7) which is provided at a right angle $\alpha_2$ from a horizontal camera axis 142 that passes through imaging axis 36. Each of the rings 101, 102, 103 and 104 is annular and when the machine 24 is assembled, all of the rings are concentric along imaging axis 36.

The first stationary ring 101 has an outer surface 124 and an inner surface 126 which defines a first ball bearing race 128. The first stationary ring 101 is sized so that it fits snugly within the area defined by the distal edge 120 of the housing outer wall 116. A plurality of bolts 115 screw ring 101 to outer wall 116.

The first moveable ring 102 also has an outer surface 130 and an inner surface 132 and a width $W_1$ which is preferably approximately twice the width of the other three rings 101, 103 and 104. Ring 102 forms outer and inner races 134, 136, the outer race 134 formed by outer surface 130 and the inner race 136 formed by inner surface 132.

In addition, referring to FIGS. 3, 5, 6 and 7, ring 102 forms first and second locking recesses, respectively, and a transition channel 140 therebetween. The recesses 136, 138 and channel 140 are all formed in the inner surface 132 and in a rear portion $W_2$ of ring 102. Referring to FIG. 3, the first recess 136 is formed so as to define an 11.25° angle $\alpha_1$ with the vertical camera axis 142. The second recess 138 is formed so as to define a right angle $\alpha_2$ with the vertical camera axis 142. The channel 140 is formed about the acute angle $\alpha_2-\alpha_1$ between the two recesses 136, 138. Preferably, each recess 136, 138 is keyed (e.g. may include two or more recesses) to ensure locking action.

A first ball bearing 144 is provided between rings 101 and 102 and is received within race 128 and race 134 so that ring 102 can rotate freely about imaging axis 36.

Referring still to FIGS. 2, 3, 4, 5, 6 and 7, the second moveable ring 104 has an outer surface 146 and an inner surface 148 that form outer and inner races 150, 152, respectively. A second ball bearing 154 provided between rings 102 and 104 is received within races 136 and 150 so that ring 104 can rotate about imaging axis 36 independent of ring 102 when not coupled thereto.

Referring to FIGS. 5, 6 and 7, a bracket 172 having three walls 175, 176 and 177 is secured by two bolts 173 to a rear surface 174 of ring 104. The three walls 175, 176 and 177 and surface 174 together define a locking channel 178 which is open on both ends and is normal to outer surface 146. Wall 176 forms a slot opening 180 having a length that extends radially outward from a point adjacent inner surface 148 toward outer surface 146.

The second stationary ring 103 has an outer surface 156 and an inner surface 158 and its outer surface 156 forms another race 160. Inner surface 158 is sized so as to snugly circumscribe the distal edge 122 of inner housing wall 118. A plurality of bolts 162 secure ring 103 to the inner wall 118. A third ball bearing 164 is provided between rings 104 and 103 and is received in races 152 and 160 so that ring 104 is completely supported but can freely rotate.

Thus, it should be appreciated that the inventive configuration includes two rings 102, 104 which are fully supported and can move independently of each other when not coupled.

In addition to the components described above, the housing also houses the locking mechanism 112. The locking mechanism 112 includes a locking tooth 182 that forms a single post 184 at an inner end and an outer end 186 than is keyed so as to be snugly receivable in either of the two locking recesses 136, 138. The tooth 182 is positioned within the locking channel 178 between rear surface 174 and bracket wall 176. An extension 188 extends from the tooth 182 and through bracket aperture 180 and is formed so that it can easily be coupled to a motor, solenoid or some manual type of control mechanism (not shown) to allow a user to move the tooth between either a locked or an unlocked position.

Referring still to FIGS. 5–7, in the locked position, the extension 188 and tooth 182 are positioned radially outward toward ring 102 (upward in the Figures) such that the outer end 186 is received within either recess 136 or recess 138. When locked, outer end 186 and a surrounding recess 136 or 138 cooperate to maintain a constant orientation between the two moveable races. In addition, when locked, the post 184 is completely outside unlocking recess 121 so that both rings 102 and 104 are decoupled from the stationary rings 101 and 103.

In the unlocked position, the extension 188 and tooth 182 are positioned radially inward toward ring 103 (downward in Figures) such that post 184 extends down into the unlocking recess 121. In addition, in the unlocked position, the outer end 186 is not received in either recess 136 or recess 138. When unlocked, outer end 186 should extend past the inner surface of ring 102 but should not extend as far as channel 140.

As indicated above, any mechanism that can move extension 188 between the locked and unlocked positions and which can maintain either the locked or unlocked position until purposefully changed, can be used with the present invention.

Referring to FIGS. 3–7, it should be appreciated that, with the present configuration, the moveable races 102, 104 can be locked together for simultaneous rotation with a constant relative configuration. It should also be evident that the races 102, 104 can only be unlocked when the second moveable race 104 is in one position on the gantry 28. That is, only when the tooth 182 is aligned with the unlocking recess 121, can races 102, 104 be unlocked. Moreover, it should be recognized that very specific relative orientations between the two moveable races 102, 104 can be defined using the locking mechanism 112. Preferably, two orientations are defined and the angular displacement between the two is 78.75° (i.e. $\alpha_2-\alpha_1$)

Referring to FIG. 4, a first gamma camera 32 is mounted to a radial track 190 which is in turn mounted to the first moveable ring 102. The first radial motor 108 is housed in the housing channel 114 and extends through ring 102, the motor 108 is linked to a pulley mechanism on track 190 so that the motor 108 can be used to move the camera 32 radially along the direction identified by arrow 192.

Similarly, a second gamma camera 34 is mounted to a radial track 194 which is in turn mounted to the second moveable ring 104. The second radial motor 110 is housed in channel 114, extends through ring 104 so that motor 110 can be used to move camera 34 radially along the direction identified by arrow 192.

Referring to FIGS. 2 and 3, the two gamma emission cameras 32, 34 are mounted securely to the front surface 41 of the gantry 28 so that when the gantry 28 rotates about axis 36, the cameras 32, 34 likewise rotate.

The gamma cameras 32, 34 are used to detect and identify coordinates of gamma emissions. Referring to FIG. 4, each camera 32, 34 includes a lead plate 40 that defines a myriad of fine holes perpendicular to its length so that the plate acts as a collimator defining parallel paths therethrough. A scintillation crystal 42 is positioned behind each collimator 40 which absorbs gamma emissions which pass through the collimator holes perpendicular to its length and produce light emissions corresponding to each absorbed gamma emission. The light emissions are directed toward an array of closely packed PMTs which are collectively designated by numeral 46.

Detected light emissions cause the PMTs 46 to produce analog signals which are sent to a processor (not shown) that uses the signals to compute M and N coordinates of each gamma emission absorbed in terms of analog signal magnitudes.

Computing the M and N coordinates in terms of analog signals is well known. One scheme for determining the M and N coordinates of each gamma emission is described in U.S. Pat. No. 4,142,102 which is incorporated herein by reference. The analog M and N coordinate signals are then used at a later time to generate an emission image corresponding to the collected data. One scheme for generating emission images is described in U.S. Pat. No. 5,337,213 which is incorporated herein by reference.

Referring still to FIG. 4, the rotational motor 106 is positioned in the pedestal 33 and includes a worm screw (not shown) which is linked to a gear (also not shown) on the first moveable ring 104 to provide power thereto.

B. Imaging Configuration

The two camera systems of the present invention can be positioned in one of two separate configurations during imaging. Referring to FIGS. 4 and 8, in a first configuration referred to herein as an opposed configuration, the two cameras 32, 34 are positioned opposite each other so that their separate camera axes, 142, 196, respectively, define a 180° angle $\alpha_3$ about the imaging axis 36. This configuration is ideal for 360° imaging because 360° of images can be generated by rotating the two cameras through 180° about axis 36.

Referring to FIGS. 2, 3 and 9, in the second configuration referred to here as a partial imaging configuration, the two cameras 32, 34 are positioned so that their camera axes 146, 142, respectively, define a 101.25° angle $\alpha_4$ about the imaging axis 36. This configuration is ideal for imaging organs that are located on a single side of a patient, for example, cardiac imaging or liver imaging. In these cases images from the side of a patient's body containing the organ are so much better than body attenuated images that would be generated using data collected on the other side of a patient's body that data from the other side of the body is not collected. The 101.25° angle is advantageous because it allows complete use of the imaging area 38 and does not cause a dead space at adjacent corners of the cameras 32, 34.

C. Movement Between Configurations

To change the camera configuration from the partial imaging configuration (FIG. 3) to the opposed configuration (FIGS. 4 and 9), assuming that the second moveable ring 104 is not in the unlocking configuration, an operator first moves the locked rings 102, 104 into the unlocking configuration wherein the tooth post 184 is aligned with the unlocking recess 121 in the housing lower wall 118. This position is shown in FIG. 3. Next, the operator, using a motor or some other tool linked to extension 188 forces the extension 188 and integrally connected tooth 182 downwardly into the position illustrated in FIGS. 5 and 7 wherein the outer end 186 is below recess 138 and the post 184 is in unlocking recess 121.

With the post 184 in recess 121 camera 34 will be directly below imaging axis 36 at its lowest possible orientation and the ring 104 will not be able to rotate (i.e. ring 104 is locked to stationary ring 103).

Next, the operator causes the first moveable ring 102 to rotate counter-clockwise about axis 36 through an arc of 78.75°. This can be done either manually or by using rotational motor 106. After 78.75° of rotation, the outer end 186 of tooth 182 contacts the end of channel 140 and limits further counter-clockwise rotation. At this point, because the original configuration angle was 101.25°, the additional 78.75° of rotation increases the configuration angle to the desired 180° opposed configuration.

In this configuration, referring to FIG. 7, the outer end 186 of tooth 182 is aligned with recess 136. The operator then forces the extension 188 and integrally linked tooth 182 radially outward toward race 102 so that outer end 186 extends into recess 136 and locks the two moveable races 102, 104 together in the opposed configuration shown in FIGS. 4 and 8. Once again, when outer end 186 is forced into recess 136, post 184 moves up and out of unlocking recess 121. Therefore, once rings 102 and 104 are locked together, they will both rotate when powered by motor 106.

To change the camera configuration from the opposed to the partial imaging configuration the process described about is just reversed. To this end, once again post 184 is aligned with unlocking recess 121, the tooth is forced radially inward until outer end 186 is outside recess 136 and post 184 is in recess 121, ring 102 is rotated clockwise through 78.75° until the outer end 186 contacts the end of channel 140, and then the tooth is again forced radially outward until post 184 is outside recess 121 and outer end 186 is inside recess 138.

It will be apparent to those of ordinary skill in the art from the above description that many variations are possible from the preferred embodiments. For example, while the locking mechanism 112 is shown as connected to moveable ring 104 and extending into stationary ring 103 when in the unlocked orientation, clearly the present invention would include a locking mechanism 112 attached to the outer moveable ring 102 which extends into stationary ring 101. In addition, the locking mechanism 112 could be attached to ring 102 and extend into stationary ring 103 when locked or, in the alternative, could be attached to ring 104 and extend into stationary ring 101 when unlocked. In addition, depending on the thickness of the boot around the camera elements, the preferred angle of 101.25° may be altered slightly to eliminate the dead space. Furthermore, it is not necessary that the locking mechanism extend into one of the stationary rings when altering the configuration angle. Instead, because one of the cameras is positioned at its lowest possible orientation during configuration angle changes, that camera and associated ring will probably not rotate when the other camera and associated race are moved.

In order to apprise the public of the various embodiments that may fall within the scope of the invention, we make the following claims.

We claim:

1. An apparatus for use with an imaging system including at least first and second imaging cameras supported for rotation about an imaging area, the apparatus comprising:

a gantry including a double ball bearing and a drive gear, the ball bearing including at least one annular stationary ring centered on an imaging axis and at least first and second moveable rings, the first moveable ring mounted to the stationary ring for rotation about the imaging axis and the second moveable ring mounted to the first moveable ring for rotation about the imaging axis, the drive gear connectable to a motor and linked to either the first or second moveable ring to rotate the linked ring about the imaging axis, the first camera mountable to the first moveable ring and the second camera mountable to the second moveable ring, when mounted, the first and second cameras are centered on first and second camera axes, respectively, which pass through the imaging axis, the first and second axes defining a configuration angle therebetween; and a locking mechanism for locking the first and second moveable rings together in at least two different configurations defining different configuration angles, when locked, the first and second moveable rings rotating together when the drive gear rotates the linked ring.

2. The apparatus of claim 1 wherein the at least one stationary ring includes two stationary rings and the second moveable ring is further mounted to the second stationary ring for movement about the imaging axis.

3. The apparatus of claim 1 wherein the first moveable ring is linked to the drive gear.

4. The apparatus of claim 1 wherein there are only two moveable rings which can support only two cameras.

5. The apparatus of claim 4 wherein a first configuration angle is 180°.

6. The apparatus of claim 5 wherein a second configuration angle is between 90° and 105°.

7. The apparatus of claim 6 wherein the second configuration angle is between 90° and 101.25°.

8. The apparatus of claim 1 wherein the ball bearing further includes a limiter that prohibits the locking mechanism from being unlocked unless at least one of the first and second moveable rings is in an unlock orientation with respect to the stationary ring.

9. The apparatus of claim 8 wherein the stationary ring forms an unlocking recess, the locking mechanism includes a post which extends into the unlocking recess when unlocked and the stationary ring forms the limiter by prohibiting unlocking of the locking mechanism unless the post is aligned with the unlocking recess.

10. The apparatus of claim 9 wherein, when in the unlocked orientation, one of the first or second cameras is positioned directly below the imaging axis.

11. A method for altering a configuration angle between medical imaging cameras for use with an imaging system which includes a gantry having a double ball bearing and a drive gear, the ball bearing including an annular stationary ring centered on an imaging axis and first and second moveable rings, the first moveable ring mounted to the stationary ring for rotation about the imaging axis and the second moveable ring mounted to the first moveable ring for rotation about the imaging axis, the drive gear connectable to a motor and linked to either the first or second moveable rings to rotate the linked ring about the imaging axis, the system also including first and second imaging cameras mounted to the first and second moveable rings, respectively, when mounted, the first and second cameras are centered on first and second axes, respectively, which pass through the imaging axis, the first and second axes defining a configuration angle, with the moveable rings coupled together so that the first and second cameras define a first configuration angle, the method comprising the steps of:

uncoupling the first and second moveable rings;

rotating the first moveable ring about the imaging axis so that the first camera moves into a position defining a second configuration angle; and locking the first and second moveable rings so that the first and second cameras define the second configuration angle.

12. The method of claim 11 wherein the system further includes a limiter which prohibits uncoupling of the first and second moveable rings unless at least one of the first and second moveable rings is in an unlocking orientation with respect to the stationary ring, the method further comprising the step of, if neither the first nor second moveable rings is in the unlocking orientation, prior to uncoupling, rotating the coupled first and second moveable rings to an unlocking orientation.

13. The method of claim 12 wherein, when in the unlocking orientation, the second camera is directly below the imaging axis so that the second camera axis is vertical.

* * * * *